US008839200B1

(12) United States Patent
Roskind

(10) Patent No.: US 8,839,200 B1
(45) Date of Patent: Sep. 16, 2014

(54) GENERATING PROFILING DATA

(75) Inventor: James Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 71 days.

(21) Appl. No.: 13/556,003

(22) Filed: Jul. 23, 2012

(51) Int. Cl.
*G06F 9/44* (2006.01)
*G06F 11/36* (2006.01)

(52) U.S. Cl.
CPC .................................. *G06F 11/3644* (2013.01)
USPC ........................................................ 717/127

(58) Field of Classification Search
CPC .................................................. G06F 11/3644
USPC ........................................................ 717/127
See application file for complete search history.

(56) References Cited

U.S. PATENT DOCUMENTS

| | | | | |
|---|---|---|---|---|
| 6,006,033 | A * | 12/1999 | Heisch | 717/158 |
| 7,200,547 | B2 | 4/2007 | Lafage et al. | |
| 7,665,070 | B2 | 2/2010 | Kailas | |
| 7,784,042 | B1 | 8/2010 | Lobo et al. | |
| 2002/0199172 | A1* | 12/2002 | Bunnell | 717/128 |
| 2004/0054764 | A1* | 3/2004 | Aderton et al. | 709/223 |
| 2004/0111719 | A1* | 6/2004 | Civlin | 717/159 |
| 2005/0251791 | A1* | 11/2005 | Hundt | 717/130 |
| 2010/0115494 | A1* | 5/2010 | Gorton, Jr. | 717/128 |

OTHER PUBLICATIONS

"What's New in JProfiler 7.0"; ej-technologies.com website, as captured by the Wayback Machine Internet Archive (archive.org) on Jul. 18, 2011.*
"JProfiler's Features"; ej-technologies.com website, as captured by the Wayback Machine Internet Archive (archive.org) on Feb. 28, 2009.*
"Definitions"; copyright.gov website; Oct. 25, 2012.*
Cluts, Nancy Winnick, "Multiple Threads in the User Interface" MSDN, Nov. 24, 1993, 15 pages.
Inter-process Communication (IPC), The Chromium Projects, printed on Apr. 10, 2012, retrieved from URL:www.chromium.org/developers/design-documents/inter-process-communication, 3 pages.
Mobile App Performance Monitoring and Crash Reporting, Crittercism, printed Jul. 17, 2012, 3 pages.
Multi-process Architecture, The Chromium Projects, printed on Apr. 12, 2012, retrieved from internet URL:www.chromium.org/developers/design-documents/multi-process-architecture, 4 pages.
Multi-process Resource Loading, The Chromium Projects, printed on Apr. 12, 2012, retrieved from internet URL:www.chromium.org/developers/design-documents/multi-process-resource-loading, 3 pages.
Process (computing), Wikipedia, Apr. 12, 2012, 5 pages.
Profiler, Chrome, printed Feb. 16, 2012, 2 pages.
Thread and Task Profiling and Tracking, The Chromium Projects, printed on Feb. 16, 2012, retrieved from internet URL:www.chromium.org/developers/threaded-task-tracking, 5 pages.
Threading, The Chromium Projects, printed on Apr. 12, 2012, retrieved from internet address https://sites.google.com/a/chromium.org/dev/developers/design-documents/threading, 4 pages.

* cited by examiner

*Primary Examiner* — Qing Chen
*Assistant Examiner* — Clint A Thatcher
(74) *Attorney, Agent, or Firm* — McDermott Will & Emery LLP

(57) ABSTRACT

Systems and methods for generating profiling data include monitoring the execution of a task on a thread of a program. Profiling data may be generated that includes metrics regarding the execution of the task. A profiling data aggregation service may aggregate generated profiling data from a plurality of devices that execute the program.

24 Claims, 4 Drawing Sheets

GENERATING PROFILING DATA

BACKGROUND

The present disclosure relates generally to generating profiling data. The present disclosure more specifically relates to generating profiling data regarding the execution of tasks within a multi-threaded executable program.

Various levels of abstraction often separate source code written by a programmer and the actual instructions executed by a computing device. For example, a programmer may write source code for a computer program in a high-level programming language, such as C++ or C. The source code may then be transformed by a compiler into assembly code. Likewise, an assembler may then convert the assembly code into an object file having assembly code with offsets. A linker may then merge one or more object files or libraries into an executable file. During linking, references to external symbols may be resolved and finalized addresses to functions and variables may be generated.

SUMMARY

Implementations of the systems and methods for generating profiling data are described herein. One implementation is a computerized method for profiling a program. The method includes receiving, at a processing circuit, a request to execute a task on a thread of the program, the program being a commercially-released version of a software product. The method also includes monitoring, by the processing circuit, the execution of the task and generating profiling data indicative of one or more metrics regarding the execution of the task. The method further includes providing, over a network, the profiling data to a profiling data aggregation service.

Another implementation is a system for profiling a program. The system includes a processing circuit operable to receive a request to execute a task on a thread of a program, the program being a commercially-released version of a software product. The processing circuit is also operable to monitor the execution of the task and to generate profiling data indicative of one or more metrics regarding the execution of the task. The processing circuit is further operable to provide, over a network, the profiling data to a profiling data aggregation service.

A further implementation is a computer-readable storage medium having instructions therein, the instructions being executable by a processor to cause the processor to perform operations. The operations include receiving a request to execute a task on a thread of a program, the program being a commercially-released version of a software product. The operations also includes monitoring the execution of the task and generating profiling data indicative of one or more metrics regarding the execution of the task. The operations further include providing, over a network, the profiling data to a profiling data aggregation service.

Another implementation is a method for aggregating profiling data. The method includes providing a program to a plurality of electronic devices, the program being a commercially-released version of a software product for use by consumers. The program is also a multi-threaded application configured to generate profiling data indicative of one or more metrics regarding the execution of a task on a program thread. The method also includes receiving, at a profiling data aggregation server, profiling data from the plurality of electronic devices regarding the execution of the task by the plurality of electronic devices. The method further includes aggregating, by the profiling data aggregation server, the profiling data from the plurality of electronic devices regarding the execution of the task. The method yet further includes generating, by the profiling data aggregation server, a report comprising the aggregated profiling data and providing the report to an electronic display.

A further implementation is a system for aggregating profiling data. The system includes a processing circuit operable to provide a program to a plurality of electronic devices, the program being a commercially-released version of a software product for use by consumers. The program is also a multi-threaded application configured to generate profiling data indicative of one or more metrics regarding the execution of a task on a program thread. The processing circuit is also operable to receive profiling data from the plurality of electronic devices regarding the execution of the task by the plurality of electronic devices. The processing circuit is further operable to aggregate the profiling data from the plurality of electronic devices regarding the execution of the task and to generate a report comprising the aggregated profiling data. The processing circuit is yet further operable to provide the report to an electronic display.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

DETAILED DESCRIPTION

Figure 1:
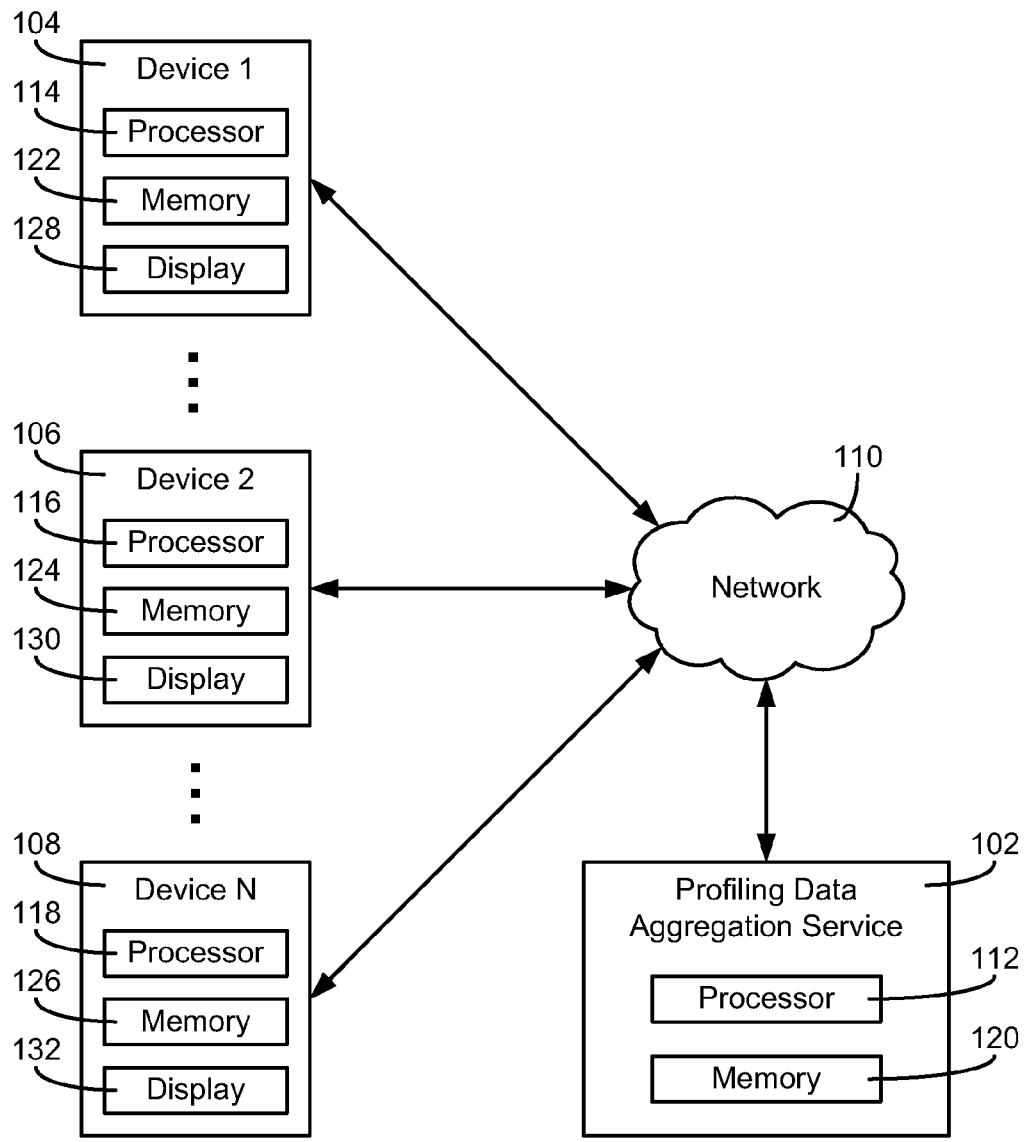
FIG. 1 is a block diagram of a computer system in accordance with a described implementation.

Various utilities may be used during the conversion of source code into an executable program, to identify bugs and other conditions that may impact the performance of the program. For example, a compiler may be configured to utilize different compiling modes that balance compilation time with optimizations that improve the performance of the compiled code. However, certain conditions that affect the performance of an executable program may remain undetectable until after the program is linked and run. In one example, assume that a program attempts to read a configuration file when the program is launched. Also assume that a user has placed the configuration file on a slow network drive, thereby increasing the amount of time needed for the program to launch. Since the program is functioning as designed, the unintentional delay in loading may not be detected until the program is fully linked and executed under those conditions. Moreover, the programmatic cause of the delay may not be immediately discernable to a user, only that the program is loading slowly.

In some implementations, profiling data may be generated regarding an executable program. As used herein, profiling data refers to data regarding the execution of the various portions of a program (e.g., processes, tasks, functions, code blocks, instructions, etc.). In some cases, profiling data may include statistics regarding the execution of the various portions of the program. For example, profiling data for a particular task may include statistics regarding the lifecycle of the task or function (e.g., execution time, creation thread, execution thread, queuing delay, resource utilization such as memory allocation, etc.). In some implementations, samples may be preserved of some profiling data for runs of substantially similar tasks (e.g., recording one or more samples of the statistics noted for a task). In some implementations, profiling data may be aggregated for substantially similar tasks or functions (e.g., count of executions, total execution time, minimum execution time, maximum execution time, maximum queuing delay, total resource utilization, etc.). In some implementations, substantial similarity of tasks may include agreement on one or more of the identifying statistics, such as the name or code location of a top-level function, or the thread on which the task was created, or the thread on which the task was executed. Profiling data differs from crash data in that crash data is generated in a reactionary manner, i.e., crash data may only be generated after a program crashes or hangs for a certain amount of time. As opposed to profiling data, crash data may be limited to information surrounding the crash and not the execution of the program during normal operation. For example, crash data does not include data regarding the successful completion of a task.

Profiling data for a program may be generated in a number of different ways. In some implementations, an executable file may be instrumented by inserting hooks into the code that record when different portions of the code are executed. However, generating profiling data is subject to the observer effect (i.e., the act of profiling a program may affect how the program would normally operate). For example, the greater the number of instrumentation instructions inserted into the program, the greater the detrimental impact on the performance of the program. Thus, a heavily instrumented program may be run in a test environment before the program is released for use by actual users, but may prove unacceptable for an actual user due to instrumentation induced performance reduction. However, how an instrumented program is used by a tester in a controlled environment may differ from how an actual user in the field may operate the program.

In various implementations, profiling data may be collected from devices operated by actual users in the field, if the users have opted in to allowing such data to be provided. The program may be configured, for example, to generate profiling data at a user's device and transmit the data to a profiling data aggregation service (e.g., a service operated by the entity that wrote the program or another similar entity). In some implementations, the degree of profiling may be such that the performance of the program may be minimally impacted, making the profiling process transparent to a user. Data collected by the service may then be used by developers of the program to diagnose errors, identify code portions at which performance may be improved, and gain a greater understanding of how the program operates in the field.

Referring to FIG. 1, a block diagram of a computer system 100 in accordance with a described implementation is shown. System 100 may include one or more devices 104-108 (e.g., a first device, a second device, etc., through an nth device) which communicate with other computing devices via a network 110. In various implementations, devices 104-108 may execute copies of a program, such as a web browser, video game, word processor, spreadsheet application, communication application, or similar. The program may be configured to generate profiling data during normal functioning of the program. For example, a word processor may be configured to generate profiling data when the program is started, a new document is created, the document is saved, and the program is closed. The program may also be configured to transmit generated profiling data to a profiling data aggregation service 102 via network 110, if a user of the device has opted in to providing such data. Data aggregation service 102 may aggregate profiling data generated by devices 104-108, to store metrics on the execution of the program.

Network 110 may be any form of computer network that relays information between devices 104-108, network 110, and profiling data aggregation service 102. For example, network 110 may include the Internet and/or other types of data networks, such as a local area network (LAN), a wide area network (WAN), a cellular network, satellite network, or other types of data networks. Network 110 may also include any number of computing devices (e.g., computer, servers, routers, network switches, etc.) that are configured to receive and/or transmit data within network 110. Network 110 may further include any number of hardwired and/or wireless connections. For example, device 104 may communicate wirelessly (e.g., via WiFi, cellular, radio, etc.) with a transceiver that is hardwired (e.g., via a fiber optic cable, a CAT5 cable, etc.) to other computing devices in network 110.

Devices 104-108 may be of any number of different types of user electronic devices configured to communicate via network 110 (e.g., laptop computers, desktop computers, tablet computers, smart phones, digital video recorders, set-top boxes for televisions, video game consoles, combinations thereof, etc.). Each of devices 104-108 may include a processing circuit configured to perform the operations described with regard to devices 104-108. In general, a processing circuit includes one or more processors and one or more memory devices. For example, devices 104-108 are shown to include processors 114-118 and memories 122-126, respectively. Memories 122-126 may store machine instructions that, when executed by processors 114-118, cause processors 114-118 to perform operations. Processors 114-118 may include microprocessors, ASICs, FPGAs, other forms of processing devices, or combinations thereof. Memories 122-126 may include, but is not limited to, electronic, optical, magnetic, or any other storage or transmission devices capable of providing processors 114-118 with program instructions. Memories 122-126 may include a floppy disk, CD-ROM, DVD, magnetic disk, memory chip, ROM, RAM, EEPROM, EPROM, flash memory, optical media, or any other suitable memory from which processor 114 can read instructions. The instructions may include code from any suitable computer programming language such as, but not limited to, C, C++, C#, Java, JavaScript, Perl, HTML, XML, Python and Visual Basic.

Devices 104-108 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housings of devices 104-108 (e.g., a built-in display, microphone, etc.) or external to the housings of devices 104-108 (e.g., a monitor connected to device 104, a speaker connected to device 106, etc.), according to various implementations. For example, devices 104-108 may include displays 128-132.

Profiling data aggregation service 102 may be one or more electronic devices connected to network 110 configured to receive profiling data from devices 104-108. For example, profiling data aggregation service 102 may be a computer server (e.g., an FTP server, file sharing server, web server, etc.) or a combination of servers (e.g., data centers, cloud computing platforms, etc.). Similar to devices 104-108, profiling data aggregation service 102 include a processing circuit. For example, profiling data aggregation service 102 may include processor 112 and memory 120 that stores program instructions executable by processor 112. Where profiling data aggregation service 102 is a combination of devices, processor 112 may represent the collective processors of the devices and memory 120 may represent the collective memories of the devices.

According to various implementations, copies of a particular program on devices 104-108 may be configured to generate profiling data during execution. The profiling data may be generated continuously during execution, at certain periods of time during execution (e.g., during startup, during shutdown, etc.), or based on one or more configuration settings (e.g., based on a configuration parameter that turns a profiling mode on and off). The generated profiling data may be sent to profiling data aggregation service 102 using either a push or pull methodology. For example, device 104 may transmit profiling data to profiling data aggregation service 102 in response to receiving a request for profiling data from profiling data aggregation service 102. In other examples, device 104 may transmit profiling data to profiling data aggregation service 102 without first receiving a request for the data (e.g., periodically, when the program is launched, when the program is closed, as a background process at night, etc.).

The program executed by devices 104-108 may use a multi-process architecture. In a multi-process architecture, a program may be divided into a set of processes that act as independent programs and work in cooperation to implement the full functionality of the program. Different processes may be allocated to different memory spaces (e.g., address spaces), when the program is executed. Processes may communicate between one another, but require the use of an inter-process communication (IPC) channel that passes inter-process messages.

The program executed by devices 104-108 may also use a multi-threaded design, in some implementations. In general, a thread differs from a process in that multiple threads may share the same memory space. Multiple threads may belong to the same process, i.e., the memory space allocated to a certain process may be used by different threads. Threads may be executed at different times, allowing a more efficient use of hardware resources. For example, a task may be executed on thread B while a task on thread A is waiting for a reply from a peripheral device. Tasks may be posted to different threads for the same process. In some implementations, an inter-process task may be spawned on a thread of a first process for execution on a different thread of another process.

In one example, a text editor may run as a single process that includes multiple threads. One thread may execute a "File Open" task to open an existing text document from a file system. Another thread may execute a "File Save" task to save changes to a text document. Both threads exist within the same process, allowing the memory space allocated to the process to be shared between the threads.

According to various implementations, the program may be profiled at the task and/or function level. Tasks that are posted to a thread within the same process and/or IPC tasks may be tracked to generate profiling data regarding the execution of the tasks. For example, data regarding how long the task took to execute, how long the task waited in a scheduler queue to execute, the source and/or destination threads for the task (e.g., on which thread the task was spawned, on which thread the task was executed, etc.), the process that executed the task, and other such data may be gathered by the program as profiling data. Statistics may also be generated regarding the collected data, such as the average amount of time taken by the task to execute, the average amount of time the task waited in the scheduler queue, etc. Profiling at the task level allows for profiling data to be gathered without significantly affecting the performance of the program. Thus, profiling data may be generated and collected when the program is run by actual users in the field (i.e., the program is run on devices 104-108). The profiling data may then be collected by profiling data aggregation service 102, if the users of devices 104-108 have opted in to sharing such data.

In some implementations, profiling data aggregation service 102 may be configured to generate one or more reports using the aggregated profiling data. For example, profiling data aggregation service 102 may receive profiling data from devices 104-108 regarding their respective executions of the same task of the program. In such a case, profiling data aggregations service 102 may aggregate the profiling data from devices 104-108 and provide aggregated metrics for the task as part of a generated report. For example, such a report may reflect the average execution time of the task by any number of users' devices in the field.

Figure 2:
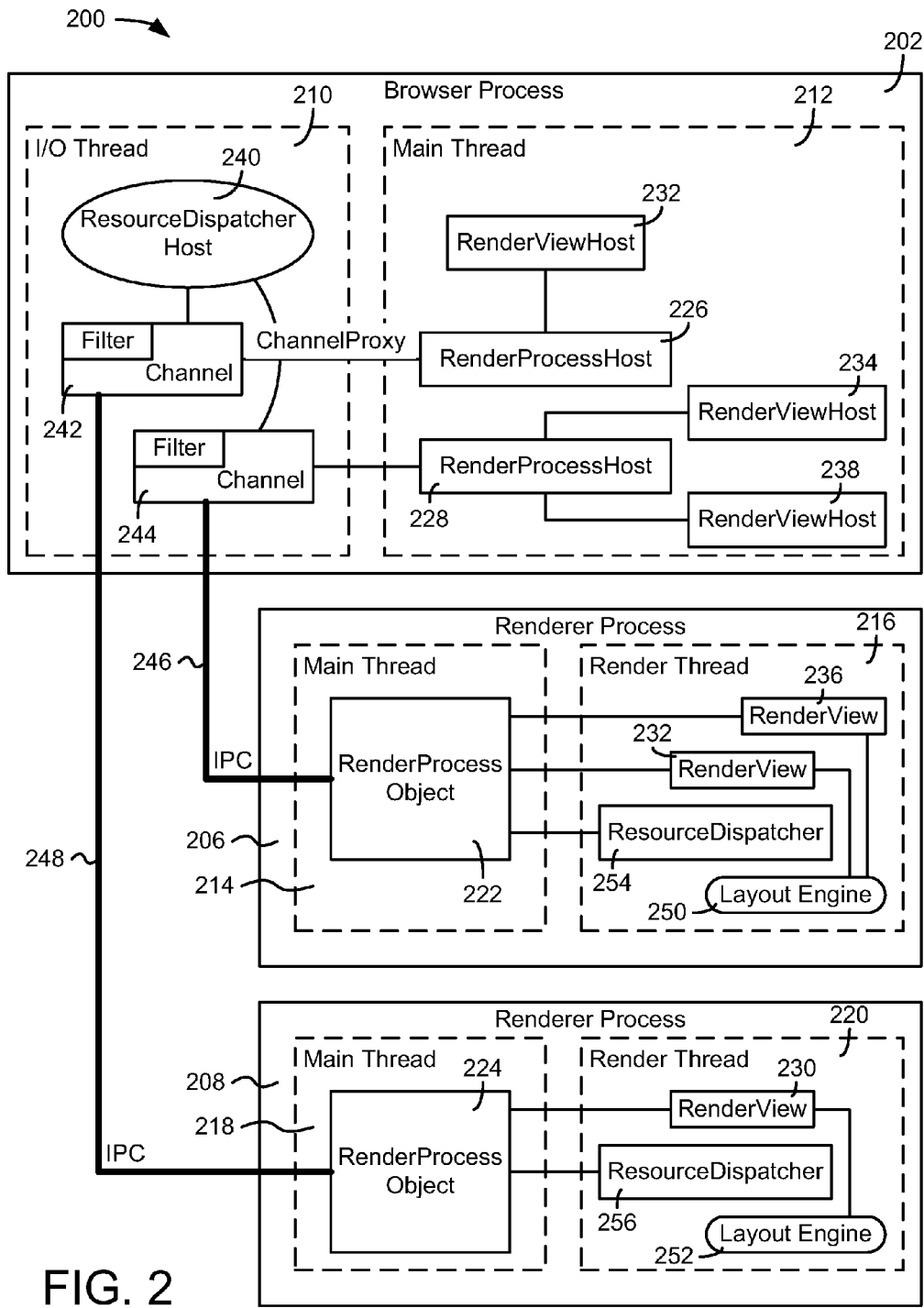
FIG. 2 is an illustration of an example multi-process architecture for a web browser.

Referring now to FIG. 2, an illustration of an example multi-process architecture 200 for a web browser is shown. The web browser may be divided into a number of processes, allowing for the execution of the program to be compartmentalized. Doing so may protect the entire browser from crashing, if a particular process crashes. For example, browser tabs (e.g., different visual areas of the program in which to view different webpages and other forms of content) may be implemented to use different processes. Thus, a bug in one webpage or plug-in that causes a particular tab to crash would not cause the other open tabs in the browser to crash. While architecture 200 is shown with regard to web browser implementations, the described methodologies may be applied to any multi-threaded application (e.g., a video game, a text editor, a messaging application, etc.).

As shown, the web browser program may be subdivided into a browser process 202 and one or more renderer processes 206-208. Browser process 202 may oversee the primary user interface functions of the browser, as well as coordinating inter-process communications with renderer processes 206-208. Renderer processes 206-208 may render content within different tabs of the web browser. For example, renderer processes 206-208 may use layout engines 250-252, which are configured to interpret a webpage markup language, such as the hypertext markup language (HTML), and to determine the visual layout of the webpage. Layout engines 250-252 may be any type of layout engine, such as the open-source engines WebKit and Gecko or the proprietary engines Trident and Presto.

Any number of threads may be allocated to browser process 202 and renderer processes 206-208. For example, browser process 202 may include a main thread 212 on which tasks associated with the main browser window are executed. Browser process 202 may also include an I/O thread 210 that handles communications between browser process 202 and other processes, such as renderer processes 206-208. Similarly, renderer processes 206-208 may include renderer threads 216, 220, on which layout engines 250, 252 execute, respectively, to interpret and render webpage layout data. Renderer processes 206-208 may also include threads 214, 218, on which IPC communications are handled for their respective renderer processes.

A resource dispatcher host 240 may execute on I/O thread 210 that coordinates the passing of messages between renderer processes 206-208 and main thread 212 of browser process 202. IPC pipes 246-248 may be assigned to renderer processes 206-208, respectively, over which IPC communications between renderer processes 206-208 and I/O thread 210 of browser process 202 may be passed. IPC pipes 246-248 may pass communications within channels 242-244 in I/O thread 210, which proxy messages through proxy channels to main thread 212. Resource dispatcher host 240 may control channels 242-244, to manage the passing of messages between renderer processes 206-208 and main thread 212 of browser process 202. Render process objects 222-224 executing on threads 214,218, respectively, may handle requests between render threads 216, 220 and corresponding render process hosts 226-228 executing on main thread 212 of browser process 202. Render process hosts 226-228 may pass browser state information and other data to their corresponding render process objects 222-224.

On each of render threads 216, 220, resource dispatchers 254-256 may coordinate resource requests with resource dispatcher host 240 via render process objects 222-224. Render view objects 230, 232, 236 may represent the contents of a webpage within a particular tab or browsing area of the program, as laid out by layout engines 250-252. Render view hosts 234, 235, 236 may execute on main thread 212 of process 202 and use data from render view objects 230, 232, 236 to display webpages within different tabs in the web browser window.

According to various implementations, profiling data may be generated regarding tasks posted to threads 210-220 and/or inter-process tasks posted via IPC pipes 246-248. For example, a task executed on render thread 216 of renderer process 206 may be programmatically monitored to determine the source thread from which the task was initiated, how long the task took to execute, and similar data. In another example, render process host 226 executing on main thread 212 may dispatch a "message send" task for execution on I/O thread 210 to send IPC data to renderer process 206. Profiling the web browser during the dispatch of tasks to its various threads allows the profiling data to be generated in a minimally-intrusive manner, so as not to significantly affect the performance of the web browser.

Profiling data may be generated at all times or may be generated only at certain times. In some implementations, the dispatch of tasks within a program may be randomly sampled. For example, n-number of samples may be recorded for some or all tasks executed within a thread and/or process. The samples may include data regarding the resources used by an executing task. For example, samples regarding the wall-clock and/or CPU time used to execute the task, the amount of memory used, the disk writes made, I/O operations performed during execution of the task, combinations thereof, or the like. In some implementations, a particular task or a part of a task (e.g., a function executed as part of the task) may be sampled. For example, only certain task or functions may be profiled.

Figure 3:
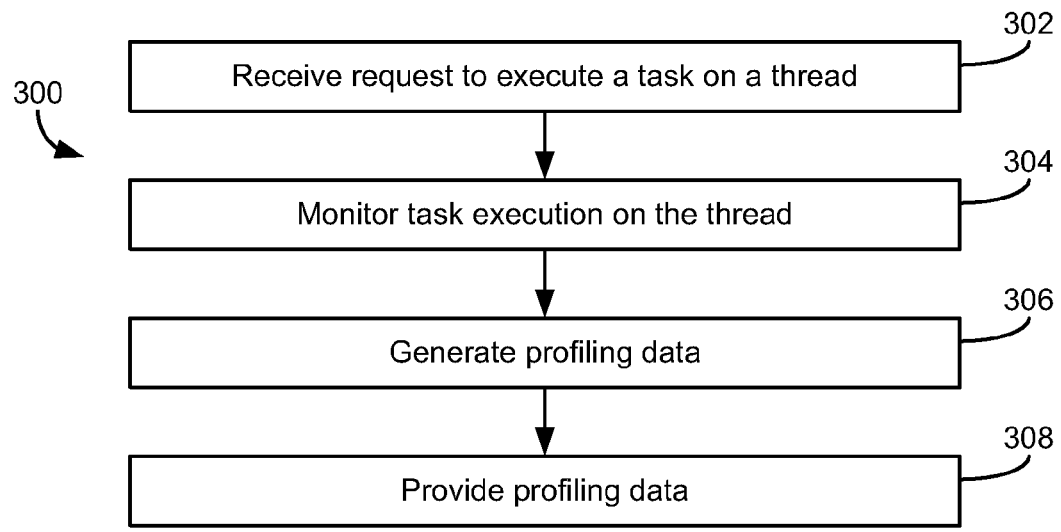
FIG. 3 is a flow diagram of a process for generating profiling data.

Referring now to FIG. 3, a flow diagram of a process 300 for generating profiling data is shown, according to various implementations. Process 300 may be implemented by a computing device executing a program configured to generate profiling data. For example, process 300 may be implemented by devices 104-108 shown in FIG. 1, or by any other form of device that includes a processor that executes instructions stored within a memory. The instructions may include a program configured to generate profiling data during execution of the program. Since the program is profiled at the task level, the generation of profiling data may have minimal impact on the performance. Thus, the program may be a commercial version of the program distributed for use by consumers in the field, in some cases. In some implementations, profiling data generated by process 300 may be provided to a device that stores and aggregates profiling data from multiple devices, such as profiling data aggregation service 102. Therefore, profiling data from the devices of multiple consumer devices may be collected and aggregated to generate metrics on the performance of the program on actual consumers' devices.

Process 300 includes receiving a request to execute a task on a thread (block 302). In a multi-threaded program, a task may be dispatched for execution on a particular thread. In general, a task refers to a set of one or more functions (e.g., portions of executable code) that may be executed on a particular thread. For example, a thread may execute a function that corresponds to sending a request for a webpage to a URL address. A task may be dispatched to the same thread, a different thread within the same process, or even to a thread of another process. For example, a task may be dispatched from a thread in a first process to a thread in another process via an IPC channel.

Process 300 includes monitoring the execution of the task on the thread (block 304). Various metrics may be collected regarding the execution of the task. Monitoring the task may include recording when the task was dispatched for execution on the thread, when the task was executed, when the task completed execution, and the resources used by the task while executing. In some implementations, programmatic hooks may be inserted into the program to monitor the execution of a task. For example, profiling hooks may be inserted into a module that handles IPC messages, to determine when an IPC task is dispatched. In another example, a program counter of a thread may be monitored to determine how tasks are executed on the thread. In general, monitoring the execution of the program at the task level allows for the generation of profiling data without significantly affecting the performance of the program. In some implementations, the program may be configured to always monitor the execution of a task and to generate profiling data. In other implementations, the program may be configured to only profile the execution of a task in response to receiving a request (e.g., based on a user-set parameter, based on a request from a profiling data aggregation service, etc.).

Process 300 includes generating profiling data regarding the execution of the task (block 306). For example, profiling data may include data indicative of the number of times the task was executed, the wall-clock and/or CPU time taken to execute the task, the amount of time the task waited in a scheduling queue before executing, the thread that dispatched the task, the thread on which the task executes, the process that executes the task, the name of a function executed as part of the task, memory used by the task, disk writes by the task, I/O operations performed by the task, and similar metrics. In some implementations, a task may be monitored randomly and/or only at certain times when the task is executed. Profiling data may also include statistics based on recorded metrics. For example, data regarding average metrics, maximum and/or minimum metrics (e.g., the maximum time to execute, etc.), and similar statistics may be calculated and included as part of the profiling data. Thus, the profiling data may be updated each time the task is executed.

According to various implementations, blocks 302-306 may be repeated any number of times within process 300. For example, a particular task may be dispatched to a thread and executed a multitude of times. Each time the task is dispatched and executed, its execution may be monitored and the resulting profiling data aggregated with other profiling data regarding the task. In non-limiting examples, such aggregated profiling data may include the average run time for the task, the maximum run time for the task, the average queue time for the task, or any other metric regarding the execution of the task.

Process 300 includes providing the generated profiling data (block 308). In some implementations, the generated profiling data may be provided to a user interface device, such as a display. For example, the profiled program may be configured to display one or more screens, allowing a user of the program to review the profiling data. In another example, a separate application may receive the profiling data as input and display the profiling data on a display. In some implementations, the generated profiling data may be provided to a profiling data aggregation service, which receives and stores profiling data from a plurality of devices that run copies for the profiled program. The profiling data may be provided in response to receiving a request from the aggregation service, at a certain point in the execution of the program (e.g., during startup, when the program is closed, etc.), as a background process, in response to receiving a command from a user interface device (e.g., from a keyboard, a mouse, touch screen display, etc.), or at any other time. In other implementations, the profiling data first may be aggregated locally (e.g., by repeating blocks 302-306 a number of times and locally aggregating the profiling data for the task) and then sent to the profiling aggregation service.

Figure 4:
FIG. 4 is an illustration of an example graphical user interface (GUI) showing profiling data on a display device.

Referring now to FIG. 4, an illustration of an example GUI showing profiling data on a display device 400 is depicted. The GUI may be configured to display various metrics and statistics from the profiling data. In some implementations, the displayed profiling data may be derived from the profiled program running on a single device. For example, the GUI may be part of the program on a user's device that executes the program. In further implementations, the GUI may display aggregated profiling data from different instances of the program running on a plurality of devices. For example, a profiling data aggregation service may generate the GUI depicted in FIG. 4 using profiling data aggregated from any number of users' devices in the field.

In some implementations, the GUI may include columns 402-424 that include information about the execution of a particular task. For example, the GUI may include column 402 that includes an execution count for a task (e.g., the number of times the task was executed since starting the profiling). Column 404 may display the total run time for the task (e.g., a wall-clock count, a CPU count, etc.). Column 406 may display the average run time for the task (e.g., the quotient of the value in column 404 divided by the value in column 402. Column 408 may display the maximum time a single run of the task took to execute. Column 410 may display the average time the task took to queue before execution (e.g., measured from when the task was constructed to when the task was run, measured from when a delayed task was asked to run to when the task was actually run, measured as the inter-process latency for an IPC task, etc.). Column 412 may display the maximum queue time over all runs of the task. Column 414 may display the thread on which the task was constructed. Column 416 may display the thread on which the task was executed. Column 418 may display the type of process associated with the thread on which the task was executed. Column 420 may display the process ID of the process that executed the task. Column 422 may display a function executed as part of the task. Finally, column 424 may display the name and/or a link to the source code location of the function indicated by column 422. For example, a programmer may click on a link in column 424 to navigate to the portion of the source code that corresponds to the task.

Any number of tasks may be represented in the GUI as row entries, in the example shown. For example, the GUI may include rows 426-432 to represent different tasks executed by the program. As shown, row 430 may indicate via columns 414, 416, 422 that a task that includes the function, "ContentBrowserClient::AllowGetCookie," may be spawned from the thread, "IOThread," and is executed on the thread, "BrowserMain." Similarly, column 424 may indicate that the function is defined within the source file, "content browser client.cc." Thus, a programmer or other interested party that wishes to make changes to the function or see how the function is defined may click on the link in column 424. For example, assume that the average run time for the task is higher than expected. In such a case, a programmer may navigate to the corresponding location in the source code to diagnose the error.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more tangible and non-transitory computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, a social networking system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a USB flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending websites to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a GUI or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computerized method for profiling a program comprising:
    receiving, at a processing circuit of a first device, a request to execute a task on a thread of a commercially-released version of a software product;
    monitoring, by the processing circuit, the execution of the task;
    generating profiling data indicative of one or more metrics regarding the execution of the task, the commercially-released version of the software product including instructions to generate the profiling data during execution of the software product on the first device; and
    providing, over a network, the profiling data to a profiling data aggregation service;
    wherein, responsive to receiving the profiling data from the first device and additional profiling data from one or more second devices, the profiling data aggregation service generates aggregated profiling data based on a combination of the profiling data from the first device and the additional profiling data from the one or more second devices.

2. The method of claim 1, wherein the profiling data identifies at least one of a total run time for the task, an average run time for the task, or a maximum run time for the task.

3. The method of claim 1, wherein the profiling data identifies a thread from which the task spawned or identifies the thread on which the task was executed.

4. The method of claim 1, wherein the profiling data identifies a source code location for one or more functions executed by the task.

5. The method of claim 1, wherein the software product is a web browser application that includes a plurality of processes, each process executing on one or more threads.

6. The method of claim 1, wherein the execution of the task is monitored by monitoring random samples of executing tasks.

7. The method of claim 1, wherein the profiling data is provided to the data aggregation service in response to receiving a request from a user interface device.

8. The method of claim 1, wherein the profiling data provided to the profiling data aggregation service comprises profiling data aggregated by the processing circuit.

9. The method of claim 1, wherein the execution of the task is always monitored by the processing circuit.

10. A system for profiling a program comprising a processing circuit operable to:
    receive a request to execute a task on a thread of a commercially-released version of a software product;
    monitor the execution of the task;
    generate profiling data indicative of one or more metrics regarding the execution of the task, the commercially-released version of the software product including instructions to generate the profiling data during execution of the software product on a first device; and
    provide, over a network, the profiling data to a profiling data aggregation service;
    wherein, responsive to receiving the profiling data from the first device and additional profiling data from one or more second devices, the profiling data aggregation service generates aggregated profiling data based on a combination of the profiling data from the first device and the additional profiling data from the one or more second devices.

11. The system of claim 10, wherein the profiling data identifies at least one of a total run time for the task, an average run time for the task, or a maximum run time for the task.

12. The system of claim 10, wherein the profiling data identifies a thread from which the task spawned or identifies the thread on which the task was executed.

13. The system of claim 10, wherein the profiling data identifies a source code location for one or more functions executed by the task.

14. The system of claim 10, wherein the software product is a web browser application that includes a plurality of processes, each process executing on one or more threads.

15. The system of claim 10, wherein the execution of the task is monitored by monitoring random samples of executing tasks.

16. The system of claim 10, wherein the profiling data is provided to the data aggregation service in response to receiving a request from a user interface device.

17. The system of claim 10, wherein the profiling data provided to the profiling data aggregation service comprises profiling data aggregated by the processing circuit.

18. The system of claim 10, wherein the execution of the task is always monitored by the processing circuit.

19. A non-transitory computer-readable storage medium having instructions therein, the instructions being executable by a processor to cause the processor to perform operations comprising:
    receiving a request to execute a task on a thread of a commercially-released version of a software product;
    monitoring the execution of the task;
    generating profiling data indicative of one or more metrics regarding the execution of the task, the commercially-released version of the software product including instructions to generate the profiling data during execution of the software product on a first device; and
    providing, over a network, the profiling data to a profiling data aggregation service;
    wherein, responsive to receiving the profiling data from the first device and additional profiling data from one or more second devices, the profiling data aggregation service generates aggregated profiling data based on a combination of the profiling data from the first device and the additional profiling data from the one or more second devices.

20. The non-transitory computer-readable storage medium of claim 19, wherein the profiling data identifies at least one of a total run time for the task, an average run time for the task, or a maximum run time for the task.

21. The non-transitory computer-readable storage medium of claim 20, wherein the profiling data identifies at least one of: a thread from which the task spawned, the thread on which the task was executed, or a source code location for one or more functions executed by the task.

22. A method for aggregating profiling data comprising:
providing a program to a plurality of electronic devices, the program being a commercially-released version of a software product for use by consumers, the program being a multi-threaded application, the program including instructions to generate profiling data indicative of one or more metrics regarding execution of a task on a thread of the program during execution of the program at the plurality of electronic devices;
receiving, at a profiling data aggregation server, the profiling data from the plurality of electronic devices regarding the execution of the task by the plurality of electronic devices;
aggregating, by the profiling data aggregation server, the profiling data from the plurality of electronic devices regarding the execution of the task;
generating, by the profiling data aggregation server, a report comprising the aggregated profiling data; and
providing the report to an electronic display.

23. A system for aggregating profiling data comprising a processing circuit operable to:
provide a program to a plurality of electronic devices, the program being a commercially-released version of a software product for use by consumers, the program being a multi-threaded application, the program including instructions to generate profiling data indicative of one or more metrics regarding the execution of a task on a thread of the program during execution of the program at the plurality of electronic devices;
receive the profiling data from the plurality of electronic devices regarding the execution of the task by the plurality of electronic devices;
aggregate the profiling data from the plurality of electronic devices regarding the execution of the task;
generate a report comprising the aggregated profiling data; and
provide the report to an electronic display.

24. The method of claim 1, wherein the aggregated profiling data comprises an average of execution times for the task on the first device and the one or more second devices.

\* \* \* \* \*